US008977285B2

(12) United States Patent
Bansal et al.

(10) Patent No.: US 8,977,285 B2
(45) Date of Patent: Mar. 10, 2015

(54) METHODS AND APPARATUS FOR USE IN ESTABLISHING A DATA SESSION VIA AN AD HOC WIRELESS NETWORK FOR A SCHEDULED MEETING

(75) Inventors: Manish Bansal, Sunrise, FL (US); Sanigepalli Venkata Praveenkumar, Sunrise, FL (US)

(73) Assignee: BlackBerry Limited, Waterloo, Ontario (CA)

(*) Notice: Subject to any disclaimer, the term of this patent is extended or adjusted under 35 U.S.C. 154(b) by 325 days.

(21) Appl. No.: 13/080,932

(22) Filed: Apr. 6, 2011

(65) Prior Publication Data

US 2012/0258726 A1    Oct. 11, 2012

(51) Int. Cl.
| | |
|---|---|
| H04W 24/00 | (2009.01) |
| H04W 4/00 | (2009.01) |
| G06F 15/173 | (2006.01) |
| G06F 15/16 | (2006.01) |
| H04L 29/08 | (2006.01) |
| H04W 4/02 | (2009.01) |

(Continued)

(52) U.S. Cl.
CPC ............ *H04L 67/141* (2013.01); *H04W 4/023* (2013.01); *H04M 1/72563* (2013.01); *H04W 76/021* (2013.01); *G06Q 10/109* (2013.01); *H04W 84/18* (2013.01); *H04L 67/146* (2013.01); *H04W 76/023* (2013.01)
USPC .................... 455/456.1; 455/422.1; 455/466; 709/223; 709/227

(58) Field of Classification Search
CPC ..... G06Q 10/109; H04W 4/02; H04W 84/18; H04L 67/18; H04L 12/1818
USPC ............... 709/204–205, 220–228; 455/422.1, 455/456.1, 456.2, 457, 552, 307, 405, 455/414.1, 466; 370/329, 260, 331, 254; 713/168; 340/539.13, 539, 539.11
See application file for complete search history.

(56) References Cited

U.S. PATENT DOCUMENTS

| | | | |
|---|---|---|---|
| 7,127,488 B1 * | 10/2006 | Scott et al. ..................... | 709/204 |
| 7,212,827 B1 | 5/2007 | Veschl | |

(Continued)

FOREIGN PATENT DOCUMENTS

WO    2010096063 A1    8/2010

OTHER PUBLICATIONS

"Service Set (802.11 network)" Wikipedia page from 2009.*

(Continued)

*Primary Examiner* — Wing F Chan
*Assistant Examiner* — Raji Krishnan
(74) *Attorney, Agent, or Firm* — Fish & Richardson P.C.

(57) ABSTRACT

In one illustrative example, data for an appointment is saved in memory. The data include start data corresponding to a start date and time of the appointment, an identifier or address of at least one other mobile device, and at least one of a session ID or key. When a current date and time matches the start date and time, the mobile device grants permission to share, with another mobile device, location information indicating a location of the mobile device. The mobile device also receives location information indicating a location of the other mobile device. When the location information indicates that the locations are within a predetermined range of each other, the mobile device connects in an ad hoc wireless network with the other mobile device with use of the session ID or key, for the communication of one or more files in a secure data session.

20 Claims, 10 Drawing Sheets

(51) Int. Cl.
*H04M 1/725* (2006.01)
*H04W 76/02* (2009.01)
*G06Q 10/10* (2012.01)
*H04W 84/18* (2009.01)

(56) References Cited

U.S. PATENT DOCUMENTS

| | | | |
|---|---|---|---|
| 7,847,686 B1* | 12/2010 | Atkins et al. | 340/539.13 |
| 2003/0156558 A1* | 8/2003 | Cromer et al. | 370/331 |
| 2004/0064355 A1 | 4/2004 | Dorenbosch et al. | |
| 2004/0266412 A1* | 12/2004 | Maes et al. | 455/414.4 |
| 2005/0101335 A1 | 5/2005 | Kelly et al. | |
| 2005/0198221 A1* | 9/2005 | Manchester et al. | 709/220 |
| 2005/0201300 A1 | 9/2005 | Bridgelall | |
| 2006/0256008 A1 | 11/2006 | Rosenberg | |
| 2006/0277282 A1* | 12/2006 | Christensen et al. | 709/223 |
| 2007/0008911 A1* | 1/2007 | MacFarlane et al. | 370/260 |
| 2007/0037574 A1 | 2/2007 | Libov et al. | |
| 2007/0226034 A1 | 9/2007 | Khan | |
| 2007/0254614 A1* | 11/2007 | Muralidharan et al. | 455/307 |
| 2007/0270139 A1* | 11/2007 | Jendbro et al. | 455/422.1 |
| 2007/0273583 A1 | 11/2007 | Rosenberg | |
| 2008/0045236 A1 | 2/2008 | Nahon et al. | |
| 2008/0070593 A1* | 3/2008 | Altman et al. | 455/457 |
| 2008/0182563 A1 | 7/2008 | Wugofski et al. | |
| 2009/0013045 A1* | 1/2009 | Maes et al. | 709/205 |
| 2009/0029724 A1* | 1/2009 | Hardy et al. | 455/466 |
| 2009/0061895 A1 | 3/2009 | Vasa | |
| 2009/0082038 A1 | 3/2009 | McKiou et al. | |
| 2009/0098903 A1 | 4/2009 | Donaldson et al. | |
| 2009/0201896 A1* | 8/2009 | Davis et al. | 370/338 |
| 2009/0325540 A1* | 12/2009 | Yach et al. | 455/405 |
| 2010/0004005 A1 | 1/2010 | Pereira et al. | |
| 2010/0082978 A1* | 4/2010 | Suzuki et al. | 713/168 |
| 2010/0144368 A1* | 6/2010 | Sullivan et al. | 455/456.2 |
| 2011/0014897 A1 | 1/2011 | Finucan | |
| 2012/0329475 A1* | 12/2012 | Ribaudo et al. | 455/456.1 |

OTHER PUBLICATIONS

European Search Report & Written Opinion for EP application # 11161385.7, Sep. 12, 2011.

* cited by examiner

US 8,977,285 B2

METHODS AND APPARATUS FOR USE IN ESTABLISHING A DATA SESSION VIA AN AD HOC WIRELESS NETWORK FOR A SCHEDULED MEETING

BACKGROUND

1. Field of the Technology

The present disclosure relates generally to mobile communication devices which operate in wireless communication networks, and more particularly to mobile device methods and apparatus for use in presetting and establishing a secure data session via an ad hoc wireless network for a scheduled in-person meeting.

2. Description of the Related Art

When two individuals from different organizations meet for the first time, they may wish to share data amongst each other (e.g. presentations, spreadsheets, etc.). Data may be exchanged between the individuals by exchanging compact discs (CDs) or Universal Serial Bus (USB) drives, for example. If mobile communication devices of the individuals are utilized, the data may be exchanged wirelessly via BLUETOOTH® transceivers of the devices. The process of using such transceivers for this purpose would be a manual process, where the individual would manually attempt to connect the mobile device to each other device in order to exchange data, which is slow and cumbersome.

Other networks and environments may experience the same or similar issues. What are needed are methods and apparatus to overcome these and other related deficiencies of the prior art.

BRIEF DESCRIPTION OF THE DRAWINGS

Embodiments of present disclosure will now be described by way of example with reference to attached figures, wherein.

DETAILED DESCRIPTION OF THE PREFERRED EMBODIMENTS

Techniques for a mobile communication device for use in establishing a data session via an ad hoc wireless network for a scheduled, in-person meeting are described. An appointment request message for setting an appointment is received by the mobile device, and data for the appointment is saved in memory. The data include start data corresponding to a start date and time of the appointment, at least one identifier or address of at least one other mobile device, and at least one of a session ID or a session key. When a current date and time matches a predetermined date and time on or before the start date and time, the mobile device grants permission to share, with the at least one other mobile device, location information indicating a real-time geographic location of the mobile device. The mobile device also receives location information indicating a real-time geographic location of the other mobile device. When the location information indicates that the geographic locations of the mobile devices are within a predetermined range of each other, the mobile device connects in an ad hoc wireless network with the other mobile device with use of the session ID or the session key, for the communication of one or more files in a secure data session.

Figure 1:
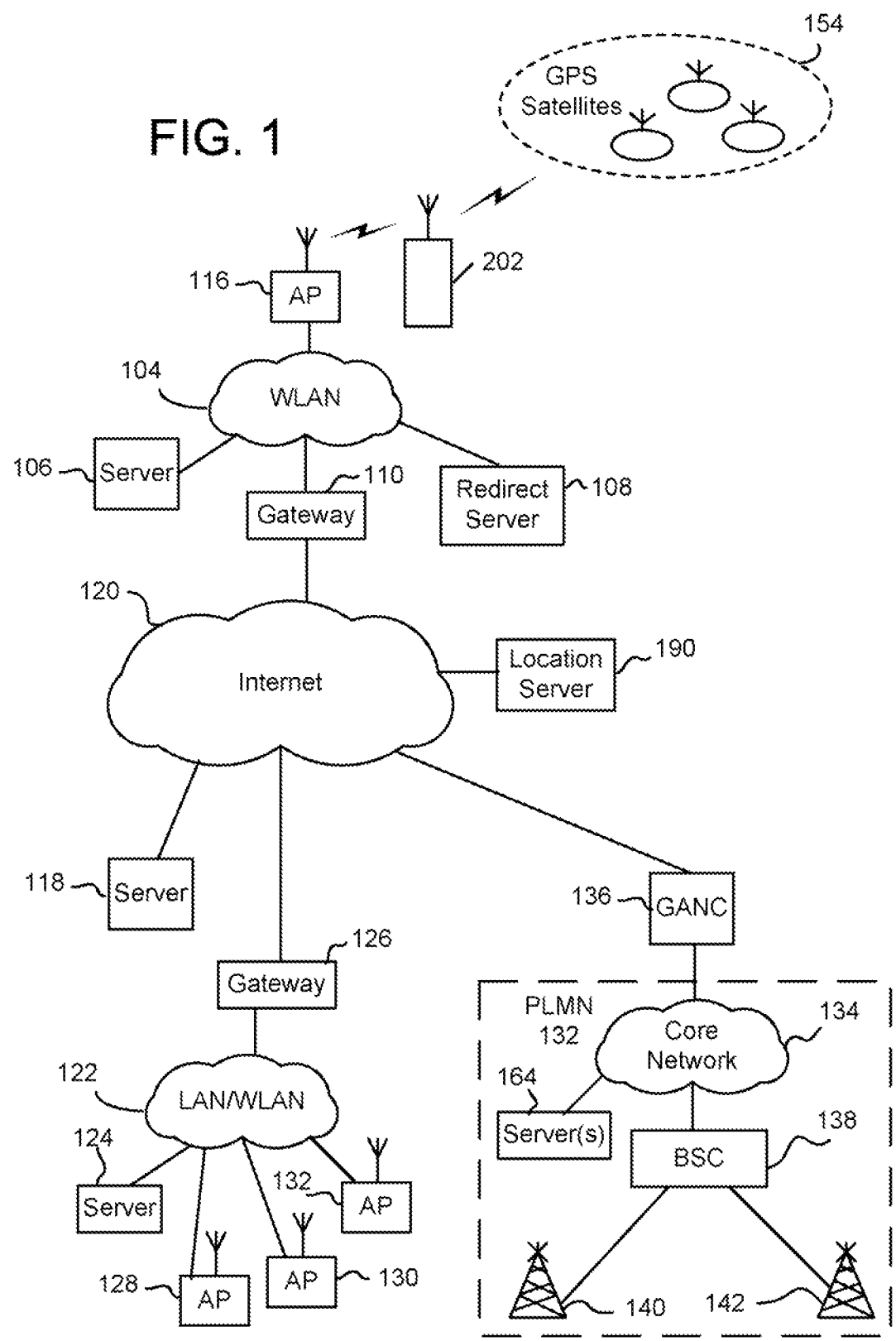
FIG. 1 is an illustrative representation of a communication system which includes a wireless communication network (e.g. a WLAN) within a mobile communication device (e.g. an end station or "STA", or mobile device) may operate.

To illustrate one exemplary network architecture within which the techniques of the present disclosure may be practiced, FIG. 1 is a communication system 100 which includes a wireless local area network (WLAN) 104 within which a mobile communication device 202 (e.g. an end station or "STA") may operate. WLAN 104 includes a wireless access points (AP) 116 for wireless communications with mobile device 202. In the present embodiment, WLAN 104 and mobile device 202 operate in accordance with IEEE 802.11 standards. Such WLANs are identifiable by a mobile device 202 from a Set Service Identifier (SSID) or Extended SSID (ESSID). WLAN 104 also includes one or more servers 106, a redirect server 108, and a gateway 110. Server 106 may provide data, applications, and/or functionality for communication services in WLAN 104.

Mobile device 202 may also operate for communications in different LANs/WLANs, such as WLAN 122. WLAN 122 has a plurality of wireless APs 128, 130 and 132, one or more servers 124, and a gateway 126. In this embodiment, WLAN 122 is a private communication network of an enterprise (small company, corporation, etc.) associated with mobile device 202. Each wireless access point 128, 130, and 132 may be associated with and identified by a basic service set identifier (BSSID).

WLANs 104 and 122 may provide or allow access to various data and communication services to its terminals. For example, the WLANs may provide for access to Internet 120 via the Web browser application, or voice telephony communication services with use of Voice over IP (VoIP) communications or other techniques. For "push-type" data or message synchronization services, mobile device 202 is enabled to maintain data synchronization with a server (e.g. server 106 or 118) for user data of an application associated with a user account. The application of mobile device 202 and the server may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program. These and other applications of mobile device 202 are also identified later in relation to FIG. 5. For the data-synchronized communications, the server maintains storage of a mapping of a user account name or identifier of the user account with a personal identification number of mobile device 202. When communications are required with mobile device 202, the personal identification number is used to route the messages to/from mobile device 202 through communication system 100.

In contrast to WLAN 122, WLAN 104 may be a public WiFi "hotspot" for public use and include what is referred to as a "captive portal" or "walled garden." For devices connected in WLAN 104 via wireless AP 116, gateway 110 is configured to permit or deny access to the data, applications, and/or functionality, as well as to permit or deny external access outside of WLAN 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization. Typically, when a request by a device in WLAN 104 is made prior to proper authorization, gateway 110 is configured to redirect the request to redirect server 108. In response, redirect server 108 is configured to respond to mobile device 202 to provide data for producing information (e.g. a Web page information) which is rendered in a visual display of mobile device 202 via a Web browser application. The information may solicit a user response. For example, the information may solicit a user registration or login with user fields for entering a user name and/or password information. The user will enter a user response via the Web browser application, for example, which is sent by mobile device 202 and received by gateway 110. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of WLAN 104.

Again, in contrast to WLAN 104, WLAN 122 may be a private communication network of an "enterprise" associated with mobile device 202. For devices attempting to access WLAN 122 via Internet 120, gateway 126 is configured to permit or deny internal access to the data, applications, and/or functionality in WLAN 122. For devices connected in WLAN 122 via one of wireless APs 128, 130, and 132, gateway 126 may be configured to permit or deny access to the data, applications, and/or functionality offered via WLAN 122 depending on whether or not a device has been authorized and what access rights are given upon authorization.

Devices may also be configured for communications in accordance with Generic Access Network (GAN) technologies. Using GAN based technologies, mobile device 202 may also access communication services from a core network 134 of a Public Land Mobile Network (PLMN) 132 (e.g. cellular). GAN technology may provide, amongst other things, a voice communication service for mobile device 202 via the WLAN hotspot. PLMN 132 includes a core network 136, a plurality of base station controllers such as a base to station controller (BSC) 138 coupled to core network 136, and a plurality of base stations such as a base station (BS) 140 and a base station 142 coupled to associated BSCs 138. Core network 136, BSC 138, and BS 140 operate in a conventional fashion as well-documented. Other PLMNs in the environment have a similar or the same architecture as PLMN 132. Such environments may be referred to as cellular telecommunications networks.

Communications between WLAN 104 and core network 134 of PLMN 132 may be facilitated through a suitable connecting network such as a broadband, wide-area IP communication network (e.g. the Internet 120) or any suitable public or private wide area network. Gateway/controller or GAN controller (GANC) 136 is provided between the Internet 120 and core network 134 of PLMN 132 in order to facilitate access to core network 134 by terminals through alternative links (e.g. radio link of wireless AP 116) different than those conventional radio links offered in the PLMN 132 (e.g. radio links of base stations 140 and 142). Thus, mobile device 202 may also access services of core network 134 of PLMN 132 via WLANs, such as WLAN 104, through use of a WLAN radio interface as opposed to a cellular telephony interface. For such communications, GANC 136 and mobile device 202 are configured to establish and maintain a (secure) tunnel connection between each other through the intervening networks.

As will be explained in more detail later below, mobile device 202 may also be configured to operate in an ad hoc wireless network with one or more other mobile devices. When connected in an ad hoc wireless network, data may be communicated "directly" between mobile device 202 and other mobile devices, i.e. without the data traversing any fixed wireless network infrastructure. For this purpose, mobile device 202 may be configured to enter into and operate in an "ad hoc mode" of operation. Alternatively, mobile device 202 may be configured to operate in an "AP mode" of operation while the other mobile device operates in a more conventional "infrastructure mode" of operation, or vice versa.

Also as shown in FIG. 1, communication system 100 may further include Global Positioning System (GPS) system 154 which includes GPS satellites. With use of GPS system 154, mobile device 202 may obtain its "real-time" geographic location. The geographic location may be data in the form of geographic coordinates, such as latitude and longitude coordinates. For this purpose, mobile device 202 may include a GPS receiver (see e.g. FIG. 2) which communicates with the GPS satellites of GPS system 154, as is well-known in the art. Here, GPS position information may be received via the GPS receiver from the GPS satellites. Note also that the geographic location may be obtained with the assistance of and/or via a cellular telecommunications network (e.g. PLMN 132), where mobile device 202 includes a cellular transceiver.

Instead of using GPS, mobile device 202 may alternatively obtain its geographic location by performing a scanning operation with use of its cellular transceiver. Through the scanning operation, mobile device 202 may receive one or more cell IDs which identify one or more cells of one or more cellular telecommunication networks within which mobile device 202 is located. A cell ID (or a set of cell IDs) obtained through the scanning operation may be understood as defining a particular geographic location of mobile device 202.

Location information of mobile devices may be regularly communicated to, saved at, and/or updated on a location server 190, and read by devices that were granted permission to access such information. Permissions to access and obtain location information for a particular mobile device may be granted and removed by the mobile device that owns the location information. One example of such location server 190 is the publically available server which is accessible via the Internet and executes an application called as "Google Latitude," which is offered by Google, Inc.

Figure 2:
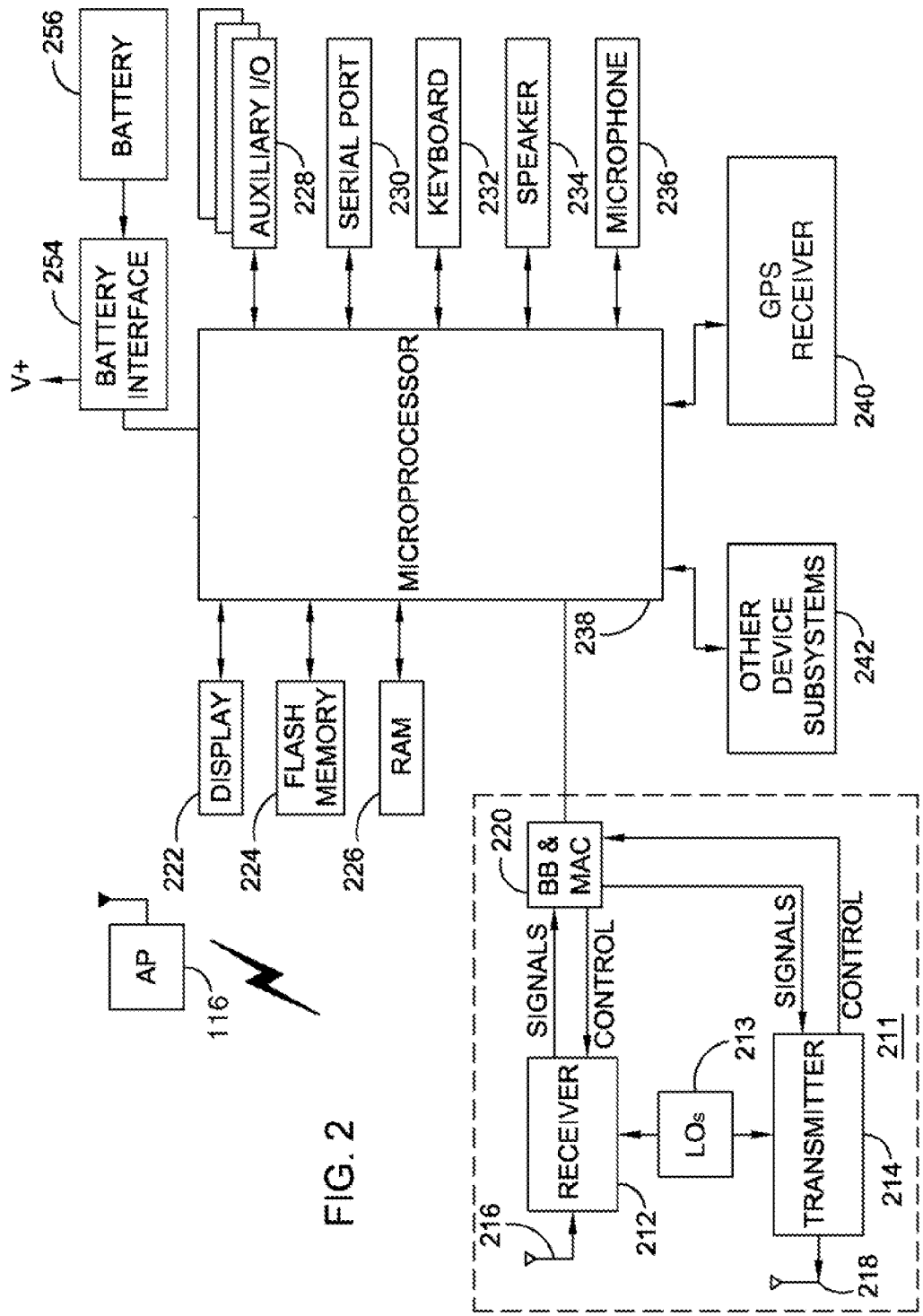
FIG. 2 is a schematic block diagram of a particular type of mobile device.

Referring now to FIG. 2, electrical components of a typical mobile communication device 202 (e.g. an end station or "STA", a mobile station, mobile terminal, or user equipment "UE", or the like) which operates with wireless APs of communication system 100 of FIG. 1 will be described. Mobile device 202 may be representative of one or more terminals shown and described in relation to FIG. 1. Mobile device 202 may be a two-way communication device having at least voice and/or advanced data communication capabilities, including the capability to communicate with other computer systems. Also, mobile device 202 may be a wireless communication device which operates in accordance with an IEEE 802.11 standards. Depending on the functionality provided by mobile device 202, it may be referred to as a data messaging device, a two-way pager, a cellular-type telephone with data messaging capabilities, a wireless Internet appliance, or a data communication device (with or without telephony capabilities).

As shown in FIG. 2, mobile device 202 is configured to wirelessly communicate with wireless APs of WLANs, such as AP 116 of WLAN 104 of FIG. 1. For communication with AP 116, mobile device 202 utilizes a communication subsystem 211. Depending on the type of device, mobile device 202 may also be configured to wirelessly communicate with other systems such as cellular telecommunication systems. With such configuration, mobile device 202 may be referred to as a "dual mode" mobile device. Although mobile device 202 may have separate and independent subsystems for these purposes, at least some portions or components of these otherwise different subsystems may be shared where possible.

Communication subsystem 211 includes a receiver 212, a transmitter 214, and associated components, such as one or more (e.g. embedded or internal) antenna elements 216 and 218, local oscillators (LOs) 213, and a processing module such as a baseband (BB) and media access control (MAC) processing module 220. Communication subsystem may be or referred to as a radio frequency (RF) transceiver or wireless transceiver. As will be apparent to those skilled in the field of communications, the particular design of communication subsystem 211 depends on the communication network in which mobile device 202 is intended to operate. In the present disclosure, communication subsystem 211 (including its associated processor/processing components) are operative in accordance with IEEE 802.11 standards.

Mobile device 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

As described earlier above, mobile device 202 may also be configured to operate in an ad hoc wireless network with one or more other mobile devices. For this purpose, mobile device 202 may be configured to enter into and operate in an "ad hoc mode" of operation. Alternatively, mobile device 202 may be configured to operate in an "AP mode" of operation while the other mobile device operates in a more conventional "infrastructure mode" of operation, or vice versa.

Since mobile device 202 may be a handheld portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated voltage V to all of the circuitry.

Mobile device 202 includes a microprocessor 238 (one type of processor or controller) that controls overall operation of mobile device 202. This control includes the techniques of presetting and establishing the secure data session via an ad hoc wireless network of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a (short-range) communication subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Keyboard 232 may be a complete alphanumeric keyboard and/or telephone-type keypad. On the other hand, keyboard 232 and display 222 may be replaced or enhanced with a touch screen display or other suitable input mechanism, or replaced or enhanced with a voice-activated input module.

Operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226. Microprocessor 238, in addition to its operating system functions, enables execution of software applications on mobile device 202. A predetermined set of applications that control basic device operations, including data and/or voice communication applications, will normally be installed on mobile device 202 during its manufacture. This includes applications or modules which are configured to perform the network selection techniques of the present disclosure. For this reason, microprocessor 238 (and any other processor(s) or modules of mobile device 202) may enable execution of particular applications or modules for performing enhanced network selection techniques for access to multiple aggregator services.

Another application that may be loaded onto mobile device 202 may be a personal information manager (PIM) application having the ability to organize and manage data items relating to user such as, but not limited to, e-mail, calendar events, voice mails, appointments, and task items. The PIM application has the ability to send and receive data items via the wireless network. In one embodiment, PIM data items are seamlessly integrated, synchronized, and updated via the wireless network, with the wireless device user's corresponding data items stored and/or associated with a host computer system thereby creating a mirrored host computer on mobile device 202 with respect to such items. This is especially advantageous where the host computer system is the wireless device user's office computer system. Additional applications may also be loaded onto mobile device 202 through network, an auxiliary I/O subsystem 228, serial port 230, (short-range) communication subsystem 240, or any other suitable subsystem 242, and installed by a user in RAM 226 or a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 may further process the signal for output to display 222 or alternatively to auxiliary I/O device 228. A user of mobile device 202 may also compose data items, for example, using keyboard 232 in conjunction with display 222 and possibly auxiliary I/O device 228. The composed items may be transmitted over a communication network through communication subsystem 211. For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output may be accomplished primarily through speaker 234, display 222 may also be used to provide an indication of the identity of a calling party, duration of a voice call, or other voice call related information, as some examples.

Mobile device 202 includes a GPS receiver 240 for communicating in a GPS system which includes GPS satellites (see e.g. FIG. 1). With use of GPS receiver 240, mobile device 202 may obtain its "real-time" geographic location. The geographic location may be data in the form of geographic coordinates, such as latitude and longitude coordinates. Mobile device 202 operates GPS receiver 240 to communicate with the GPS satellites of the GPS system, as is well-known in the art, where GPS position information is received via GPS receiver 240 from the GPS satellites. Note also that the geographic location may be obtained with the assistance of and/or via a cellular telecommunications network, where mobile device 202 includes a cellular transceiver.

Mobile device 202 of FIG. 2 may further include an additional component which is a short-range communications subsystem, such as a BLUETOOTH® communication module (not shown in FIG. 2), to provide for communication with similarly-enabled systems and devices. Note that the BLUETOOTH® standards may be defined by or based on BLUETOOTH® Specification Version 2.0, Volumes 1 and 2, for example.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication.

Figure 4:
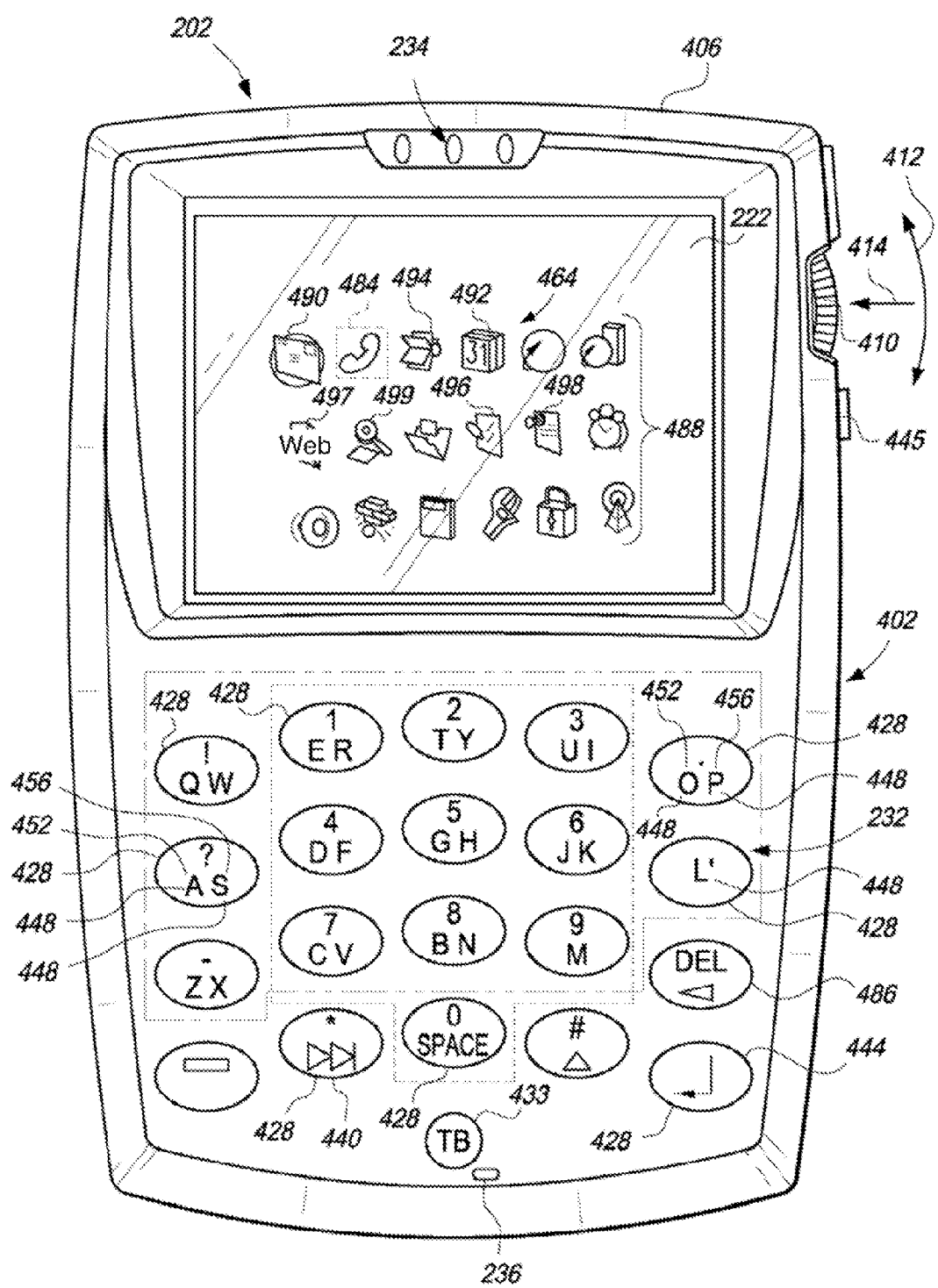
FIG. 4 is an illustrative example of a user interface of the mobile device of FIGS. 1 and 2.

Referring ahead now to FIG. 4, which is shown is an illustrative representation of an exemplary user interface 402 of a mobile device (mobile device 202 or 292 of FIGS. 1 and 2). Although shown enlarged in FIG. 4 for clarity, this mobile device 202 is sized to be a handheld portable device. Mobile device 202 includes at least display 222, keyboard 232, speaker 234, microphone 236, and an I/O positioning mechanism 410. I/O positioning mechanism 410 may be utilized to position a cursor in display 222, select displayed items in display 222, and/or change (e.g. by panning) the view which is displayed in display 222. The cursor may be or include a pointer, a movable item or other visual cue used to mark a position or point to another item on a display, in order to, for example, indicate position for data entry or for selection of the other item. In the embodiment shown, I/O positioning mechanism 410 is a scrollwheel mounted on a side of the housing. As an alternative to or in addition to use of a scrollwheel, a wide range of one or more I/O positioning mechanisms may be employed, such as a trackball, a touch pad, a joystick button, a mouse, a touchscreen, a tablet, or other whether presently known or unknown.

In the present embodiment, keys 428 of keyboard 232 are disposed on a front face of a housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. Characters may include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of I/O positioning mechanism 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry. I/O positioning mechanism 410 may serve as another input member and is both rotatable, as is indicated by an arrow 412, to provide selection inputs to the processor, and also can be pressed in a direction generally toward housing 406, as is indicated by an arrow 414 to provide another selection input to the processor.

Figure 3:
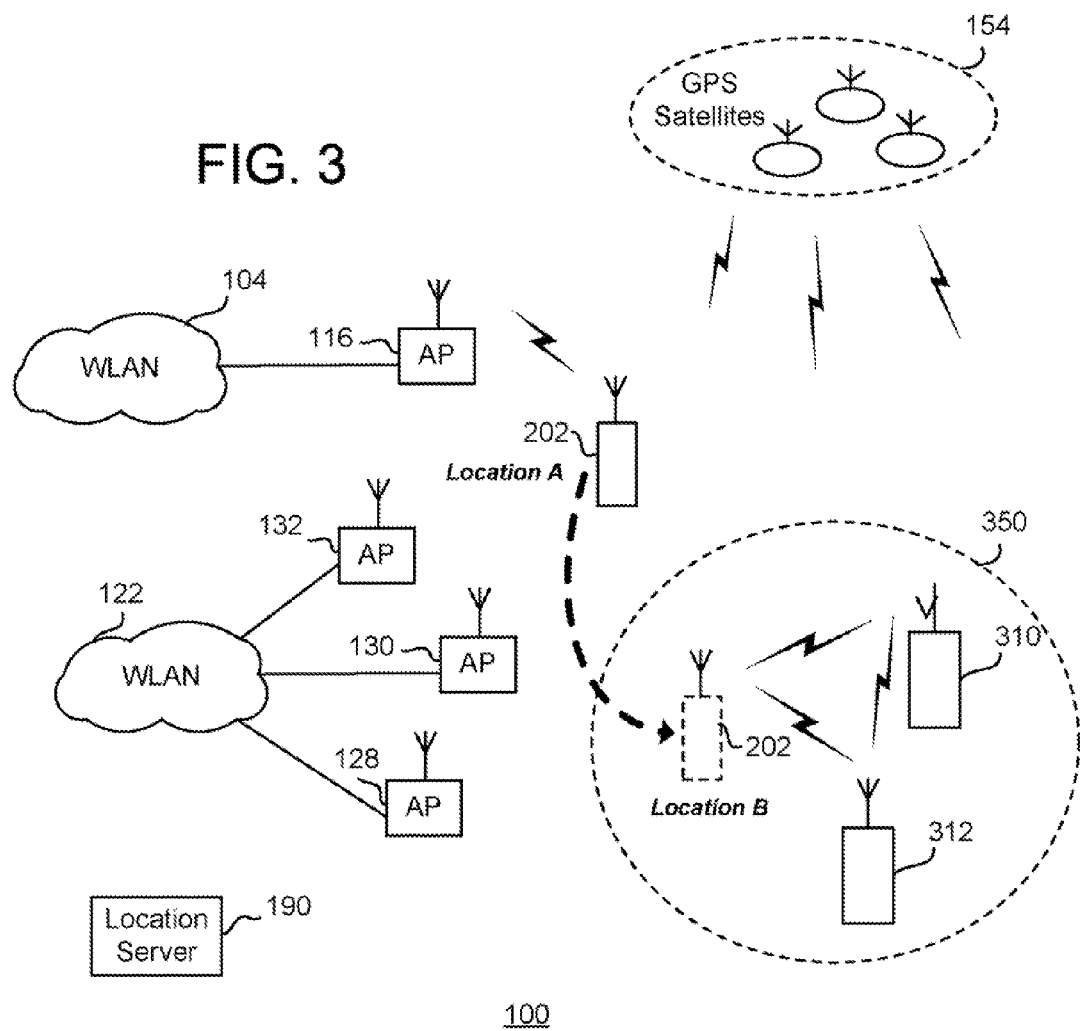
FIG. 3 is an illustrative example of the mobile device of FIGS. 1-2, which operates in a WLAN at a "Location A" and subsequently operates in an ad hoc wireless network at a "Location B" for a conference meeting.

Display 222 may include a cursor 484 that depicts generally where the next input or selection from user interface 402 will be received. Display 222 is shown in FIG. 4 as displaying a home screen that represents a number of applications 586 (FIG. 3 shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Messages icon 497, a MemoPad icon 498, and a Search icon 499, respectively.

Figure 5:
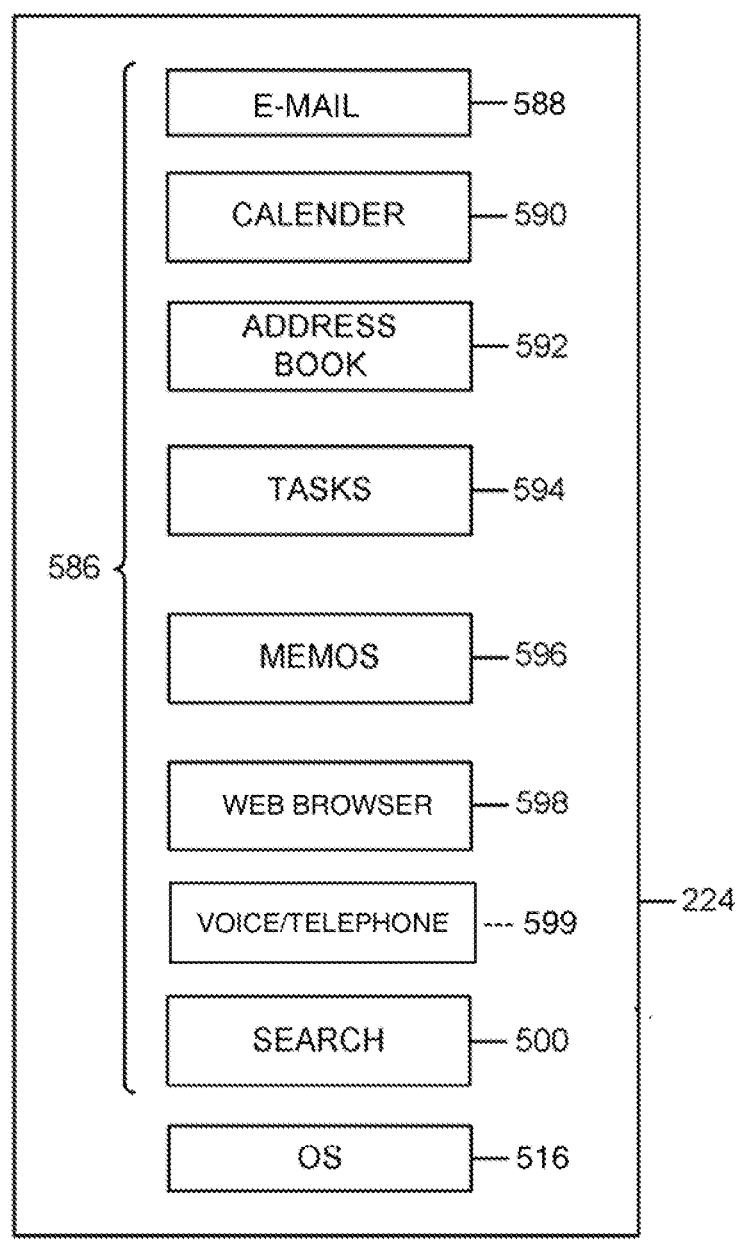
FIG. 5 is an illustrative representation of memory of a mobile device which includes a plurality of applications, many of which require some form of data communications.

As shown now further in FIG. 5, memory 224 of the mobile device includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Web Browser application 598 (FIG. 5) associated with Web Browser icon 497 (FIG. 4), a Voice/Telephone application 599 (FIG. 5) associated with Voice/Telephone icon 484, and a Search application 500 (FIG. 5) associated with Search icon 499 (FIG. 4). An operating system (OS) program 516 also resides in memory 224.

The "home" screen output is shown in FIG. 4 as currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating I/O positioning mechanism 410 to highlight E-mail icon 490 and providing a selection input by translating I/O positioning mechanism 410 in the direction indicated by arrow 438. As another example, display 222 displays icon 499 associated with Search application 500 and accepts input from I/O positioning mechanism 410 to initiate a search from that icon 499. Applications 586 may be additionally or alternatively initiated (opened or viewed) from user interface 402 by providing another suitable input to it, e.g. by suitably rotating or "rolling" a trackball, and/or providing a selection input by, for example, pushing the trackball, or e.g. by touch-sliding a touch pad.

Movement, navigation, and/or scrolling with use of a cursor/view positioning mechanism is beneficial given the relatively large size of visually displayed information and the compact size of display 222 of FIG. 4, and since information and messages are typically only partially presented in the limited view of display 222 at any given moment. As previously described, I/O positioning mechanism 410 is one helpful cursor/view positioning mechanism to achieve such movement. I/O positioning mechanism 410, which may be referred to as a scrollwheel, specifically includes a circular disc which is rotatable about a fixed axis of housing 302 and may be rotated by the end user's index finger or thumb. When the information or message is being partially displayed, an upwards rotation of I/O positioning mechanism 410 causes an upwards scrolling such that display 222 presents viewing of an upper portion of the information or message. Similarly, a downwards rotation of I/O positioning mechanism 410 causes a downwards scrolling such that display 222 presents viewing of a lower portion of the information or message. I/O positioning mechanism 410 is mounted along a fixed linear axis such that the end user can depress I/O positioning mechanism 410 inwards toward housing 406 (e.g. with the end user's index finger or thumb) for selection of information. Again, see the direction indicated by an arrow 414 of I/O positioning mechanism 410 shown.

Although a specific mobile device 202 has just been described, any suitable mobile communication device or terminal may be part of the inventive methods and apparatus which will be described in fuller detail below. Note that many components of mobile device 202 shown and described may not be included (e.g. a full QWERTY keypad may be optional). Again, keyboard 232 and display 222 may be substituted or enhanced with a touch screen display or other suitable input mechanism, or enhanced or replaced with a voice-activated input module. Also, although the description of the architecture relates to a specific example for illustration, where the WLAN is an IEEE 802.11-based network, different environments may be applicable as well. The wireless network may be a WiMAX-based network (i.e. IEEE 802.16), or an Ultra-WideBand (UWB)-based network (i.e. IEEE 802.15), as a few examples.

As described in the Background section, when two individuals from different organizations meet for the first time, they may wish to share data amongst each other (e.g. presentations, spreadsheets, etc.). The data may be quite confidential in nature, being limited to access to only particular designated individuals. The data may be exchanged between the individuals by exchanging compact discs (CDs) or Universal Serial Bus (USB) drives, for example. If mobile device 202 is utilized for such exchange, data may be exchanged wirelessly via its BLUETOOTH® transceiver. The process of using such transceivers for this purpose would be a manual process, where the individual would manually attempt to connect mobile device 202 to each other device in order to exchange data. This is slow and cumbersome.

Techniques of the present disclosure described herein (e.g. in relation to FIGS. 3 and 6-10) help alleviate the aforementioned problems. As shown in FIG. 3, mobile device 202 operates in WLAN 104 at a "Location A," and subsequently operates in an ad hoc wireless network 350 at a "Location B" for a scheduled, in-person conference meeting with other mobile devices 310 and 312. Initially in the technique, an appointment request message for setting the appointment is received by mobile device 202, and data for the appointment is saved in memory of mobile device 202. The data at least include start data corresponding to a start date and time of the appointment, identifiers and/or addresses of the other mobile devices 310 scheduled in the appointment, and at least one of a session ID or a session key. When a current date and time matches a predetermined date and time on or before the start date and time of the appointment, mobile device 202 grants permission to share, with at least one of the mobile devices 310, location information indicating a real-time geographic location of mobile device 202. The mobile device also receives location information indicating a real-time geographic location of at least one of the other mobile devices 310 and 312. Location information may be originally obtained through use of GPS receivers of the devices in connection with GPS system 154. Further, the location information may be regularly saved, updated, communicated via location server 190. When the location information indicates that the geographic locations of mobile device 202 and the at least one other mobile device 310 or 312 are within a predetermined range of each other, mobile device 202 initiates a connection with and the establishment of a data session in ad hoc wireless network 350 with the other mobile devices 310 and 312. The connection and establishing of the data session is performed with use of the session ID and the session key stored in association with the appointment. Thereafter, mobile device 202 may operate to receive and/or transmit one or more files in the data session with the other mobile devices 310 and 312. The session ID may be a Set Service Identifier (SSID) of the ad hoc wireless network, and the session key may be utilized to encrypt/decrypt the data being communicated in the ad hoc wireless network.

Figure 6:
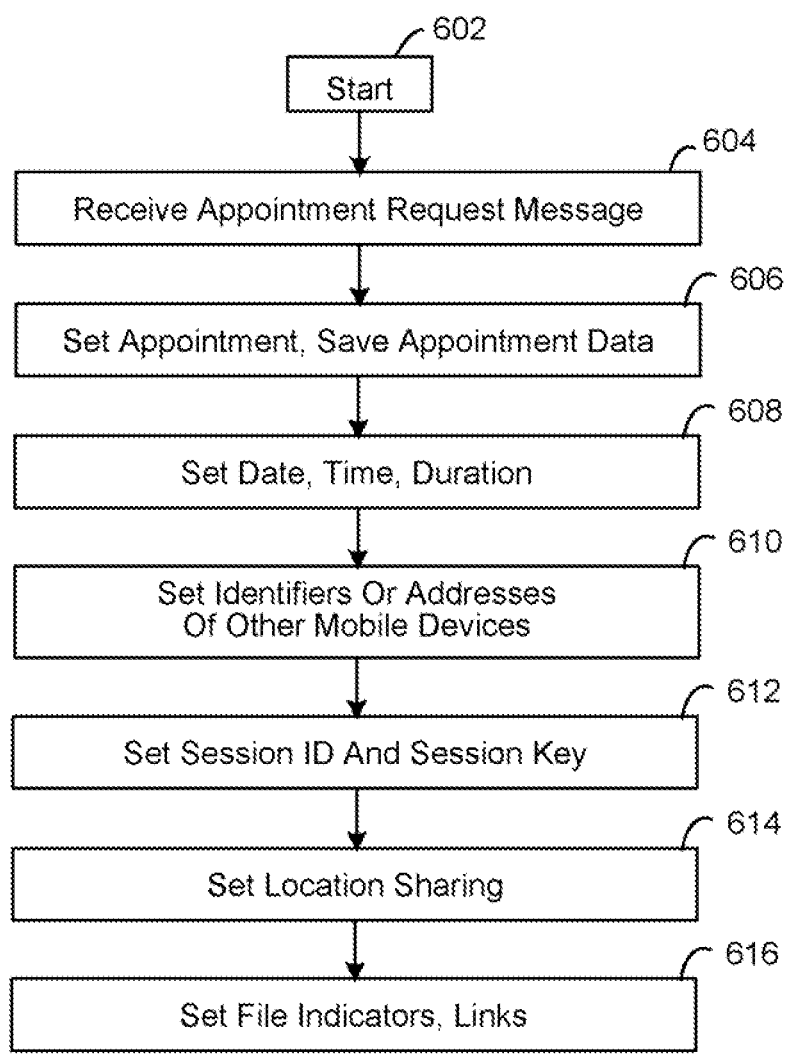
FIG. 6 is a flowchart for describing a first part of a method for use in establishing (or presetting the establishment of) a data session via an ad hoc wireless network for a scheduled, in-person meeting.

Referring ahead now to FIG. 6, a flowchart of a first part of an illustrative method for use in establishing (or presetting the establishment of) a secure data session via an ad hoc wireless network for a scheduled in-person meeting is shown. The method of FIG. 6 may be performed by mobile device 202 described in relation to FIGS. 1-5 and utilize the environment, components, and associated devices as described. In general, the techniques described in relation to the flowchart of FIG. 6 may be performed by one or more controllers or processors of the mobile terminal with use of its RF transceiver. A computer program product which may embody the technique may include a computer readable medium (e.g. memory of the mobile device, computer disk, CD-ROM, etc.) having computer instructions stored therein which are executable by the one or more processors of the mobile device for performing the technique.

Beginning at a start block 602 of FIG. 6, the method begins where the mobile device is enabled for operation, and may operate for communication in a wireless communication network, as is conventional. As described earlier, the mobile device may contain one or more applications, such as a calendar application (e.g. a calendar/scheduling software application, such as a Microsoft Outlook® or like software program). The mobile device may therefore receive an appointment request message for setting an appointment in the application (step 604 of FIG. 6). The appointment and data associated therewith are set and stored in memory of the mobile device (step 606 of FIG. 6). The appointment and data may include calendar information which includes a date, a time (start and/or end times), and/or a duration of the appointment (step 608 of FIG. 6).

Such appointment may be made for scheduling a meeting between members of different organizations. In addition, the appointment may be associated with an anticipated communication session, such as a data session, between other mobile devices of the members of the scheduled meeting. Accordingly, data associated with the appointment may include identifiers and/or addresses of the other mobile devices of the members in the scheduled meeting (step 610 of FIG. 6). In addition, the data associated with the appointment may include at least one of a session ID or a session key for the data session (step 612 of FIG. 6). The session ID may be a network identifier (e.g. a Set Service Identifier or "SSID", or Extended SSID or "ESSID") and used by the mobile device to identify and connect with the appropriate network for establishing the ad hoc wireless network. Alternatively, the session ID may be an identifier that is separate from the network identifier stored in association with the appointment. On the other hand, the session key used by the mobile device to encrypt and decrypt data in the data session. Only those mobile devices knowing the proper session ID and/or session key will be able to join in the data session via the ad hoc wireless network.

The session ID and the session key may be selected or produced by the mobile device that originated the appointment. If the mobile device did not originate the appointment, then the mobile device receives the session ID and the session key as part of the data of the appointment request message received from the originating party. If the mobile device originated the meeting, then the mobile device selects or produces the session ID and the session key for the data session, and sends these data as part of the appointment request message to the other mobile devices, as identified by their saved identifiers and/or addresses.

Further, the data associated with the appointment may also include an indication of whether or not the mobile device will participate in location sharing with the other mobile devices (step 614 of FIG. 6). If enabled, location sharing will cause the mobile device to obtain and share its real-time geographic location with the other mobile devices, for the purpose of assisting in connecting in the ad hoc wireless network and establishing the secure data session. The indication is selectable by the user of the mobile device via the user interface.

Finally, the data associated with the appointment may also include one or more file indicators or file links of files stored in the mobile device (step 614 of FIG. 6). The file indicators or file links will be used by the mobile device for identifying the stored files that will be communicated to the other mobile devices in the data session via the ad hoc wireless network. The file indicators or file links may be selected and/or entered by the user via the user interface.

Figure 8:
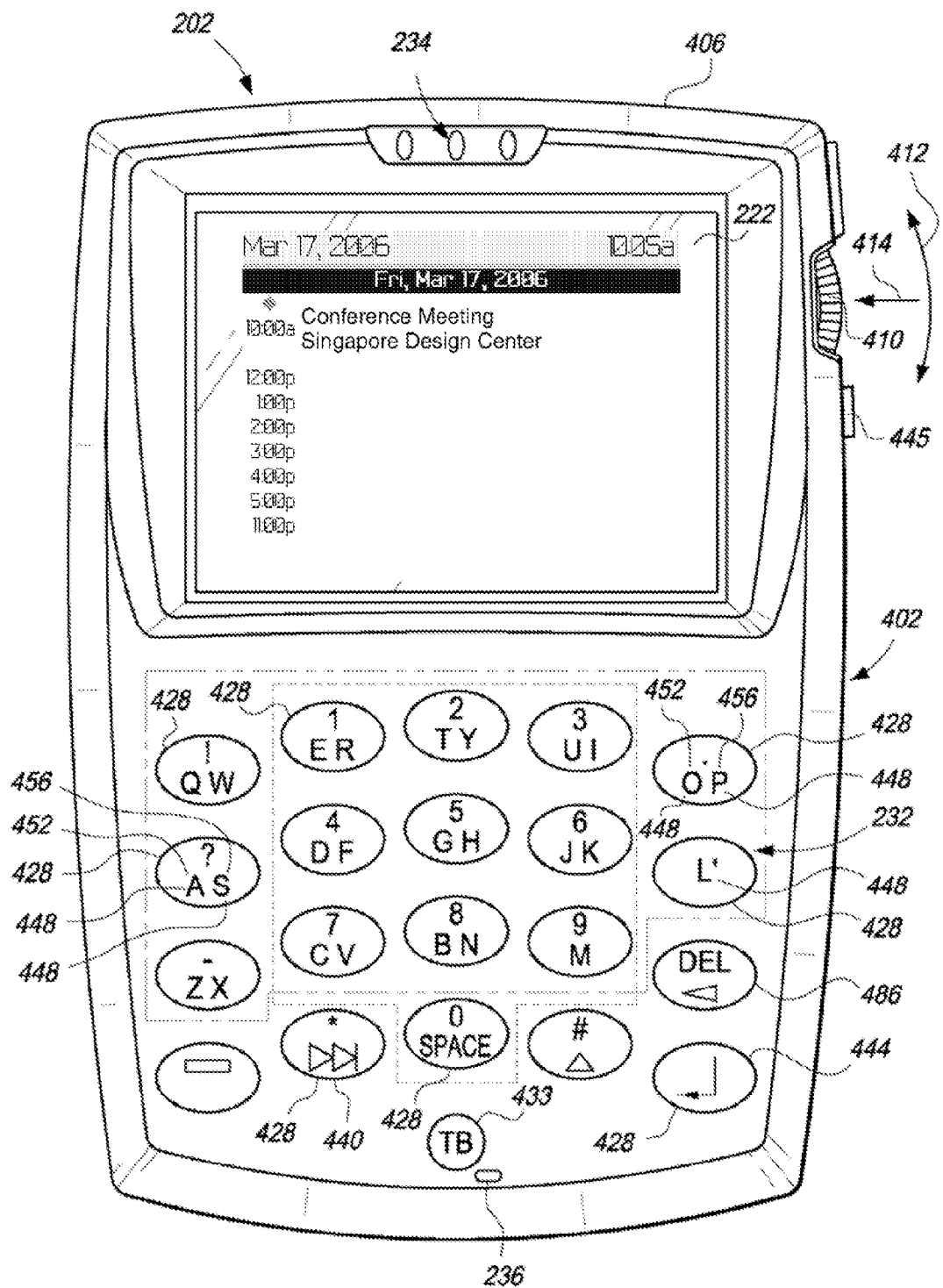
FIG. 8 is the user interface of the mobile device of FIG. 4, showing a calendar application which is open for an appointment to be set.
Figure 9:
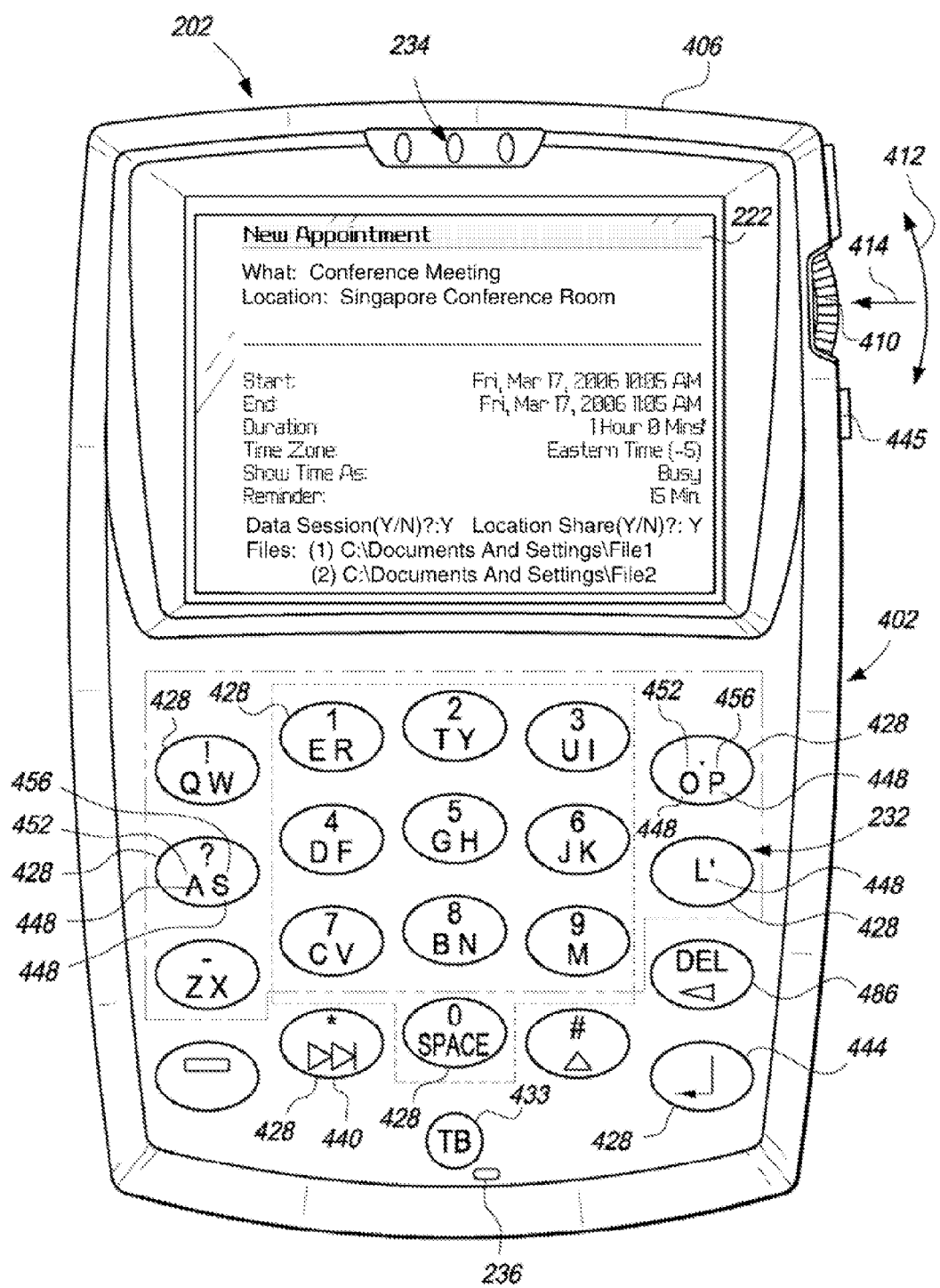
FIG. 9 is the user interface of the mobile device, showing data which may be stored in association with the appointment.
Figure 10:
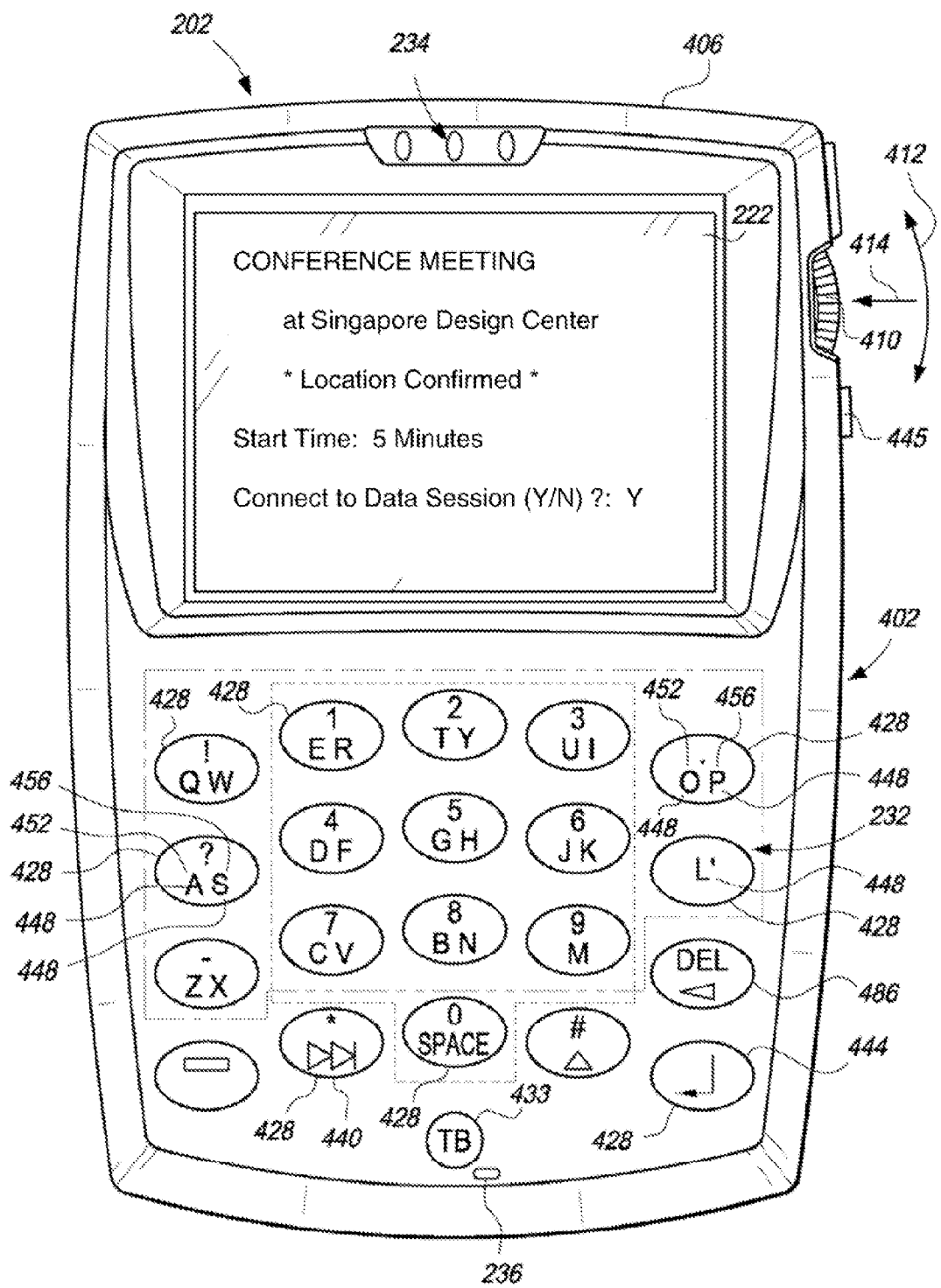
FIG. 10 is the user interface of the mobile device, showing a user prompt which may be displayed when it is time for the appointment.

One example of an appointment which is set and listed in a daily calendar list of a calendar application is shown in the illustration of FIG. 8. A detailed view of this appointment is shown in the illustration of FIG. 9. As shown in FIGS. 8-9, a start date for the appointment is Mar. 17, 2006, with a start time of 10:05 am, an end time of 11:05 am, and a duration of one (1) hour. The subject of the appointment is set and indicated as "Conference Meeting." The location of the appointment is set and indicated as "Singapore Design Center." The displayed data also indicate that the appointment is set and associated with an anticipated data session ("Y" is for "Yes") between meeting members, and that location sharing between meeting members is enabled ("Y" is for "Yes"). Finally, the selected file indicators or file links of files of mobile device for sharing are set and indicated in the appointment.

Figure 7:
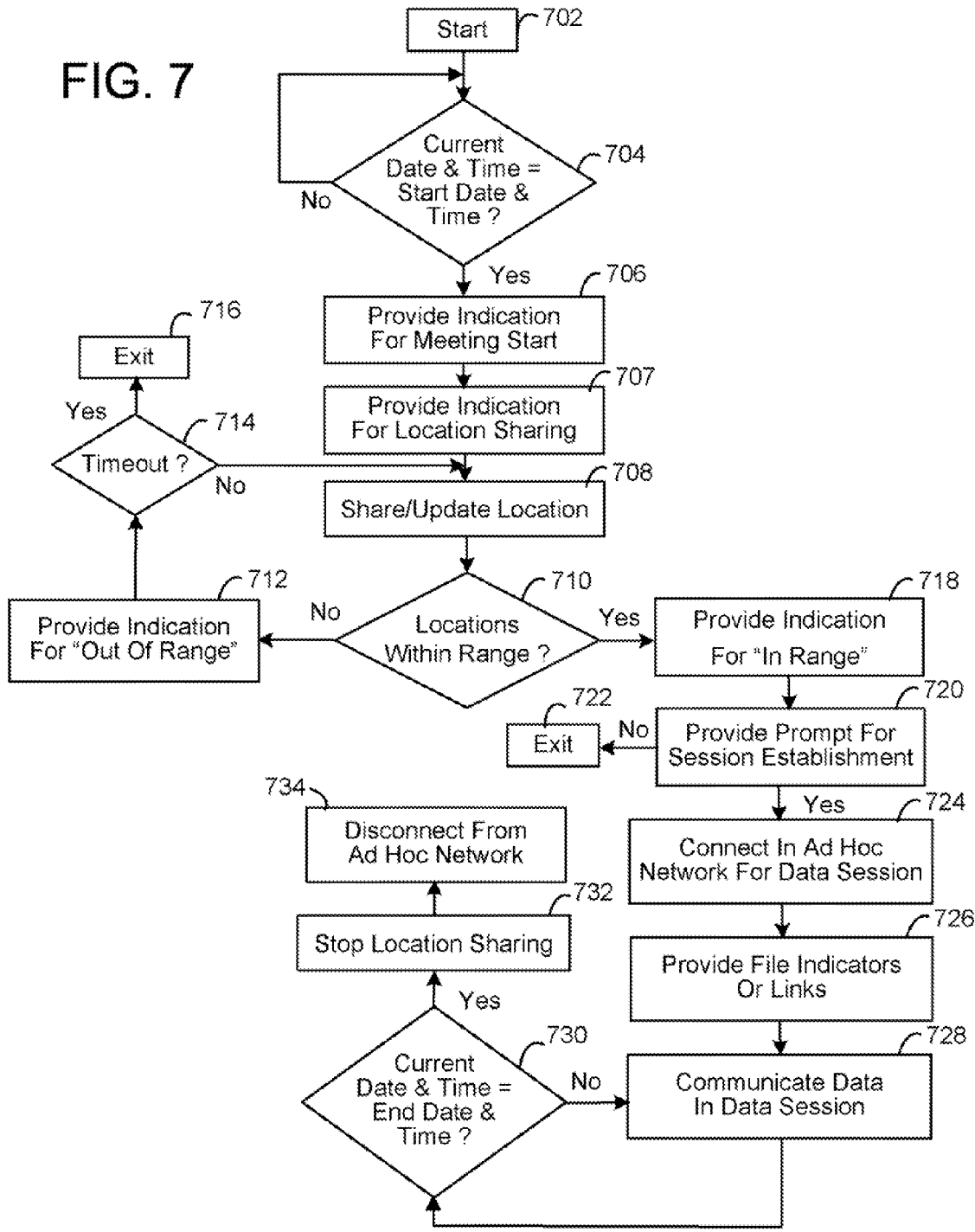
FIG. 7 is a flowchart for describing a second part of the method for use in establishing the data session via the ad hoc wireless network for the scheduled, in-person meeting.

FIG. 7 is flowchart of a second part of the illustrative method for use in establishing a secure data session via an ad hoc wireless network for an in-person meeting. Like FIG. 6, the method of FIG. 7 may be performed by mobile device 202 described in relation to FIGS. 1-5 and utilize the environment, components, and associated devices as described. In general, the techniques described in relation to the flowchart of FIG. 7 may be performed by one or more controllers or processors of the mobile terminal with use of its RF transceiver. A computer program product which may embody the technique may include a computer readable medium (e.g. memory of the mobile device, computer disk, CD-ROM, etc.) having computer instructions stored therein which are executable by the one or more processors of the mobile device for performing the technique.

Beginning at a start block 702 of FIG. 7, the method begins where the mobile device is enabled for operation, and may operate for communication in a wireless communication network, as is conventional. In the background, the mobile device tracks the current date and time. The mobile device also monitors whether the current date and time matches a predetermined date and time relative the start date and time of any scheduled appointment (e.g. on or just before, say e.g. 5 minutes before, the scheduled start date and time) (step 704 of FIG. 7). If "no" in step 704, the mobile device continues such monitoring on a regular basis. On the other hand, if the current date and time matches the predetermined date and time in step 704, then the mobile device initiates the establishment of a data session via an ad hoc wireless network, as will be described in relation to the subsequent steps.

In particular, the mobile device provides and causes an indication for the meeting start to be displayed in its visual display (e.g. "Meeting Start" and/or corresponding icon) (step 706 of FIG. 7). In addition, the mobile device provides and causes an indication for location sharing to be displayed in its visual display (e.g. "Location Sharing Active" and/or corresponding icon) (step 707 of FIG. 7). In step 707, the mobile device may display a user input prompt for granting permission to share the real-time geographic location of the mobile device, where the permission to share is provided in response to an acceptance of the user input prompt by the user (or e.g. otherwise no such permission is granted).

Accordingly, the mobile device begins sharing geographic location with at least one of the other mobile devices scheduled for the meeting (step 708 of FIG. 7). Here, the mobile device may send a location request message for requesting and receiving location information which indicates its real-time geographic location. This may be done with use of its GPS receiver in connection with GPS system. This location information may be communicated to at least one of the other mobile devices, for example, by a mobile device transmitting its location to the other mobile device via the wireless network. On the other hand, location information of mobile devices may be regularly communicated to, saved at, and/or updated on location server 190 (see e.g. FIGS. 1 and 3), and read by devices that were granted permission to access such information. Again, permissions to access and obtain location information for a particular mobile device may be granted and removed by the mobile device that owns the location information.

With use of the location information, the mobile device compares whether the location information indicates that the geographic locations of the mobile device and at least one of the other mobile devices are within a predetermined range of each other (step 710 of FIG. 7). The predetermined range may be, for example, a range of about 5-10 meters, for example. If "no" at step 710, then the mobile device provides and causes an indication of "out-of-range" to be display in its visual display (e.g. "CONFERENCE MEETING—Please Advance To Proper Meeting Location") (step 712 of FIG. 7). The mobile device also checks a timer for identifying a timeout condition (step 714 of FIG. 7) and, if there is no timeout, repeats or continues to share or update the location information as described in step 708. If there is a timeout condition in step 714, then the process exits (step 716 of FIG. 7), where no data session for the scheduled appointment is established for the mobile device.

On the other hand, if the location information indicates that the geographic locations of the mobile device and at least one of the other mobile devices are within the predetermined range of each other at step 710, then the mobile device provides and causes an indication of "in-range" to be display in its visual display (e.g. "CONFERENCE MEETING—Proper Meeting Location Confirmed") (step 718 of FIG. 7). The mobile device also provides and causes a prompt for establishing the data session to be displayed in the visual display (step 720 of FIG. 7). An illustrative example of the presentation in the display of the mobile device is provided in relation to FIG. 10. The prompt may be a user input prompt which requires input from the user to confirm whether or not the secure data session should be established. On the other hand, the prompt may merely indicate or confirm that the mobile device is itself automatically establishing the secure data session via the ad hoc network.

If the mobile device receives a user acceptance of the user input prompt via the user interface, or if automatic connection is provided or enabled, then the mobile device establishes a data session in an ad hoc wireless network, using the saved session ID and the session key associated with the appointment (step 724 of FIG. 7). On the other hand, if the mobile device receives user rejection of the user input prompt, then the process exits (step 722 of FIG. 7), where no data session for the scheduled appointment is established for the mobile device.

In step 724, the mobile device connects in the ad hoc wireless network. When connected in such network, data may be communicated "directly" between the mobile device and the other mobile devices, i.e. without the data traversing any fixed wireless network infrastructure. For this purpose, the mobile device may enter and operate in an "ad hoc" mode of operation. This mode of operation may be viewed in contrast to an infrastructure mode of operation of the mobile device. Alternatively, the mobile device may be configured to operate in an "AP mode" of operation while the other mobile device operates in a more conventional "infrastructure mode" of operation, or vice versa.

In step 724, the session ID (which may be a SSID, or separate from the SSID) is retrieved from the data associated with the appointment, and used by the mobile device to identify and connect with the appropriate network for establishing the ad hoc wireless network. The session key is also retrieved from the data associated with the appointment, and used by the mobile device to encrypt and decrypt data in the secure data session. Only those mobile devices knowing the proper session ID and/or session key will be able to join in the data session via the ad hoc wireless network.

When connected in the ad hoc wireless network, the mobile device provides and causes the one or more file indicators or file links of the files to be displayed in the visual display (step 726 of FIG. 7). The file indicators or file links are used by the mobile device for readily identifying the stored files, for communicating such data to the other mobile devices in the secure data session via the ad hoc wireless network (step 728 of FIG. 7). As apparent, the mobile device operates to receive and/or transmit one or more files in a secure data session with the other mobile devices.

During the secure data session, the mobile device continues to track the current date and time, and also monitors whether the current date and time matches the end date and time of the appointment (step 730 of FIG. 7). If "no" in step 730, the mobile device continues data communication in the data session via the ad hoc wireless network in step 728. On the other hand, if the current date and time matches the end date and time in step 730, then the mobile device terminates the location sharing with the mobile devices (step 732 of FIG. 7). In addition, the mobile device may disconnect from the ad hoc wireless network (step 734 of FIG. 7) and terminate the secure data session. The flowchart ends.

Note that, although operation has been described in relation to the one single mobile device, the other mobile devices in the meeting operate in the same or corresponding manner as the described mobile device.

As is apparent, an advantage in some of the embodiments of the present disclosure include automation of data session establishment based on prestored information. Another advantage in some of the embodiments include data session establishment that is secure, without requiring users to have concern or involvement regarding such security. Yet another advantage in some of the embodiments include the automation of data session establishment without users having to specify a location in advance.

Thus, techniques for a mobile communication device for use in establishing a data session via an ad hoc wireless network for a scheduled, in-person meeting have been described. An appointment request message for setting an appointment is received by the mobile device, and data for the appointment is saved in memory. The data include start data corresponding to a start date and time of the appointment, at least one identifier or address of at least one other mobile device, and at least one of a session ID or a session key. When a current date and time matches a predetermined date and time on or before the start date and time, the mobile device grants permission to share, with the at least one other mobile device, location information indicating a real-time geographic location of the mobile device. The mobile device also receives location information indicating a real-time geographic location of the other mobile device. When the location information indicates that the geographic locations of the mobile devices are within a predetermined range of each other, the mobile device connects in an ad hoc wireless network with the other mobile device with use of the session ID or the session key, for the communication of one or more files in a data session.

The above-described embodiments of the present disclosure are intended to be examples only. Those of skill in the art may effect alterations, modifications and variations to the particular embodiments without departing from the scope of the application. The invention described herein in the recited claims intends to cover and embrace all suitable changes in technology. For example, although the detailed description focuses on the use of an IEEE 802.11 network as the WLAN, any suitable network may be utilized. For example, the WLAN may be a WiMAX-based network (i.e. IEEE 802.16), or an Ultra-WideBand (UWB)-based network (i.e. IEEE 802.15), as a few alternatives.

What is claimed is:

1. A method in a mobile communication device for use in establishing a data session via an ad hoc wireless network, the method comprising:
   receiving, at the mobile device having a memory for maintaining a calendar application, an appointment request message for setting an appointment, the mobile device being a participant of the event;
   saving data associated with the appointment in the calendar application maintained in the memory of the mobile device, the data including start data corresponding to a start date and time of the appointment, at least one identifier or address of at least one other mobile device, and a network identifier which identifies an ad hoc wireless network;
   when a current date and time matches a predetermined date and time on or before the start date and time of the appointment:
      granting permission to share, with the at least one other mobile device, location information indicating a real-time geographic location of the mobile device;
      receiving location information indicating a real-time geographic location of the at least one other mobile device; and
      when the location information indicates that the geographic locations of the mobile devices are within a predetermined range of each other:
         connecting in the ad hoc wireless network, with use of the network identifier retrieved from the data saved in association with the appointment, for communication of one or more files in a data session.

2. The method of claim 1, further comprising: when the current date and time matches the predetermined date and time on or before the start date and time of the appointment:
   causing a user input prompt for granting permission to share the real-time geographic location of the mobile device to be displayed; and
   granting the permission to share in response to an acceptance of the user input prompt.

3. The method of claim 1, further comprising: when the current date and time matches the predetermined date and time on or before the start date and time of the appointment, and the location information indicates that the geographic locations of the mobile devices are within a predetermined range of each other:
   causing a user input prompt for connecting in the ad hoc wireless network to be displayed; and
   connecting in the ad hoc wireless network in response to an acceptance of the user input prompt.

4. The method of claim 1, wherein the ad hoc wireless network is established in accordance with IEEE 802.11.

5. The method of claim 1, wherein the location information is obtained with use of a Global Positioning System (GPS) receiver of the mobile device.

6. The method of claim 1, further comprising:
   creating or selecting the network identifier in response to the setting of the appointment; and
   sending the network identifier to the other mobile device.

7. The method claim 1, wherein the data saved in association with the appointment further includes a session key, and the method further comprises:
   using the session key for encrypting/decrypting the communication in the data session via the ad hoc wireless network.

8. The method of claim 1, wherein the network identifier comprises a Set Service Identifier (SSID) of the ad hoc wireless network.

9. The method of claim 1, wherein the data of the appointment further includes end data corresponding to an end date and time of the appointment, the method further comprising: when the current time is outside of the start and end times of the appointment: removing the permission to share, with the at least one other mobile device, the location information indicating the real-time geographic location of the mobile device.

10. The method of claim 1, which is embodied as computer instructions stored in memory of the mobile device.

11. A mobile communication device, comprising:
    one or more processors; memory coupled to the one or more processors; a radio frequency (RF) transceiver module coupled to the one or more processors; a global positioning system (GPS) receiver module coupled to the one or more processors;
    the one or more processors being configured to:
       receive an appointment request message for setting an appointment in a calendar application maintained in the memory, the mobile device being a participant of the event;
       save data for the appointment in the memory, the data including start data corresponding to a start date and time of the appointment, at least one identifier or address of at least one other mobile device, and a network identifier which identifies an ad hoc wireless network;

when a current date and time matches a predetermined date and time on or before the start date and time of the appointment:

grant permission to share, with the at least one other mobile device, location information indicating a real-time geographic location of the mobile device;

receive location information indicating a real-time geographic location of at least one other mobile device; and when the location information indicates that the geographic locations of the mobile devices are within a predetermined range of each other:

connect, via the RF transceiver module, in an ad hoc wireless network with the at least one other mobile device with use of the network identifier, for communication of one or more files in a data session.

12. The mobile device of claim 11, which further comprises a user interface including a display, and wherein the one or more processors are further configured to: when the current date and time matches the predetermined date and time on or before the start date and time of the appointment:

cause a user input prompt for granting permission to share the real-time geographic location of the mobile device to be displayed in the display; and granting the permission to share in response to an acceptance of the user input prompt.

13. The mobile device of claim 11, which further comprises a user interface including a display, wherein the one or more processors are further configured to: when the current date and time matches the predetermined date and time on or before the start date and time of the appointment, and the location information indicates that the geographic locations of the mobile devices are within the predetermined range of each other:

cause a user input prompt for connecting in the ad hoc wireless network to be displayed in the display; and connect in the ad hoc wireless network in response to an acceptance of the user input prompt.

14. The mobile device of claim 11, wherein the RF transceiver module is configured in accordance with IEEE 802.11.

15. The mobile device of claim 11, wherein the one or more processors are further configured to:

create or select the network identifier in response to the setting of the appointment; and send the network identifier to the other mobile device.

16. The mobile device of claim 11, wherein the data saved in association with the appointment further includes a session key, and the one or more processors are further configured to:

use the session key for encrypting/decrypting the communication in the data session via the ad hoc wireless network.

17. The mobile device of claim 11, wherein the network identifier comprises a Set Service Identifier (SSID) of the ad hoc wireless network.

18. The mobile device of claim 11, wherein the data of the appointment further includes end data corresponding to an end date and time of the appointment, and the one or more processors are further configured to: when the current time is outside of the start and end times of the appointment: removing the permission to share, with the at least one other mobile device, the location information indicating the real-time geographic location of the mobile device.

19. The mobile device of claim 11, wherein the one or more processors are further configured to: receive, from the other mobile device, the network identifier in the appointment request message.

20. The mobile device of claim 11, wherein the one or more processors are configured to receive the location information by receiving, from a location server, the location information indicating the real-time geographic location of at least one other mobile device.

* * * * *